United States Patent
Kanamori

(10) Patent No.: US 11,650,775 B2
(45) Date of Patent: May 16, 2023

(54) INFORMATION PROCESSING APPARATUS, INFORMATION PROCESSING METHOD AND STORAGE MEDIUM ENABLING SELECTION FROM AMONG MULTIPLE PAPER FEED UNITS

(71) Applicant: CANON KABUSHIKI KAISHA, Tokyo (JP)

(72) Inventor: Hideyuki Kanamori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/181,498

(22) Filed: Feb. 22, 2021

(65) Prior Publication Data
US 2021/0271438 A1 Sep. 2, 2021

(30) Foreign Application Priority Data
Feb. 28, 2020 (JP) .............................. JP2020-033359

(51) Int. Cl.
*G06F 3/12* (2006.01)
*B41J 11/00* (2006.01)

(52) U.S. Cl.
CPC ........... *G06F 3/1255* (2013.01); *B41J 11/003* (2013.01); *G06F 3/1205* (2013.01); *G06F 3/1243* (2013.01)

(58) Field of Classification Search
CPC .... G06F 3/1255; G06F 3/1205; G06F 3/1243; G06F 3/1285; B41J 11/003; B41J 11/485
See application file for complete search history.

(56) References Cited

U.S. PATENT DOCUMENTS

| | | | |
|---|---|---|---|
| 2007/0263242 A1* | 11/2007 | Takahashi | H04N 1/00413 358/1.14 |
| 2013/0335475 A1* | 12/2013 | Yano | B41J 13/0009 347/16 |
| 2020/0174727 A1* | 6/2020 | Yamada | G06F 3/1255 |
| 2020/0234094 A1* | 7/2020 | Kanai | G06F 3/1286 |

FOREIGN PATENT DOCUMENTS

JP 2011-161793 A 8/2011

* cited by examiner

*Primary Examiner* — Iriana Cruz
(74) *Attorney, Agent, or Firm* — Venable LLP

(57) ABSTRACT

An information processing apparatus includes an obtaining unit that obtains media information concerning paper sheets set in media feed units provided to a printing apparatus, respectively, and includes a control unit. The control unit determines that designation information for determining a used media feed unit to be used for printing is not required in a case where it is possible to selectively determine the used media feed unit from the media feed units based on the media information. The control unit indicates the designation information in a case where it is not possible to determine the used media feed unit based on the media information.

14 Claims, 14 Drawing Sheets

| SUPPORTED PAPER SIZES media-supported |
|---|
| A4 |
| A5 |
| 3R |
| POSTCARD |

| SUPPORTED PAPER TYPES media-type-supported |
|---|
| AUTO |
| PLAIN PAPER |
| MATTE COATED PHOTO PAPER |
| GLOSSY PHOTO PAPER |
| POSTCARD |

| SUPPORTED PAPER FEED TRAYS media-source-supported |
|---|
| AUTO |
| FIRST CASSETTE |
| SECOND CASSETTE |

FIG.9A

| PAPER FEED TRAY PAPER INFORMATION media-col-ready |||
|---|---|---|
| PAPER SIZES media-size | PAPER TYPES media-type | PAPER FEED TRAYS media-source |
| 3R | GLOSSY PHOTO PAPER | FIRST CASSETTE |
| A4 | PLAIN PAPER | SECOND CASSETTE |

FIG.9B

| PAPER FEED TRAY PAPER INFORMATION media-col-ready |||
|---|---|---|
| PAPER SIZES media-size | PAPER TYPES media-type | PAPER FEED TRAYS media-source |
| A4 | PLAIN PAPER | FIRST CASSETTE |
| A4 | PLAIN PAPER | SECOND CASSETTE |

FIG.9C

| PAPER FEED TRAY PAPER INFORMATION media-col-ready |||
|---|---|---|
| PAPER SIZES media-size | PAPER TYPES media-type | PAPER FEED TRAYS media-source |
| A4 | GLOSSY PHOTO PAPER | FIRST CASSETTE |
| A4 | PLAIN PAPER | SECOND CASSETTE |

FIG.9D

INFORMATION PROCESSING APPARATUS, INFORMATION PROCESSING METHOD AND STORAGE MEDIUM ENABLING SELECTION FROM AMONG MULTIPLE PAPER FEED UNITS

BACKGROUND OF THE INVENTION

Field of the Invention

The present invention relates to a technique for feeding paper selectively from multiple paper feed units provided in a printing apparatus.

Description of the Related Art

There has been known a technique applicable to a printing system prepared by connecting a personal computer (hereinafter referred to as a PC) to a printer, which is configured to perform printing while automatically determining a paper feed unit that contains paper sheets of the same paper size based on a paper size selected by a user on the PC.

Japanese Patent Laid-Open No. 2011-161793 discloses a technique configured to execute a mode of performing printing unconditionally on paper supplied from a paper feed unit (a paper feed port) selected based on the size of paper to be used, and a mode of causing a user to confirm the selected paper feed unit.

SUMMARY OF THE INVENTION

According to the technique disclosed in Japanese Patent Laid-Open No. 2011-161793, the printing is executed even if the type of paper is not an intended type in the case of performing the printing unconditionally by using the paper from the media feed unit selected based on the size of paper. In this case, there is a problem of a potential failure to obtain an image of desired quality. On the other hand, in the case of executing the mode of causing the user to confirm the selected media feed unit, a display requesting for the confirmation is always carried out irrespective of whether or not the size and type of the paper in a selected cassette coincide with those of the paper designated by the user. In this case, there is a problem of reduction in operation efficiency.

An object of the present invention is to provide a technique that enables appropriate and efficient determination of a media feed unit that contains designated paper out of multiple media feed units provided to a printing apparatus.

The present invention causes a computer, which is an information processing apparatus, to function as an obtaining unit which obtains media information concerning paper sheets set in media feed units provided to a printing apparatus, respectively, and as a control unit which determines that designation information for determining a used media feed unit to be used for printing is not required in a case where it is possible to selectively determine the used media feed unit from the media feed units based on the media information, and indicates the designation information in a case where it is not possible to determine the used media feed unit based on the media information.

According to the present invention, it is possible to appropriately and efficiently determine a media feed unit that contains designated paper out of media feed units provided to a printing apparatus.

Further features of the present invention will become apparent from the following description of exemplary embodiments with reference to the attached drawings.

BRIEF DESCRIPTION OF THE DRAWINGS

FIGS. 9A to 9D are diagrams showing examples of printer information fed back from the printer;

DESCRIPTION OF THE EMBODIMENTS

Embodiments of the present invention will be described below in detail with reference to the accompanying drawings. Note that the following embodiments are not intended to limit the present invention as defined in the appended claims. It is to be also understood that a combination of all the features described in the embodiments are not always essential for a solution of the present invention.

First Embodiment

Figure 1:
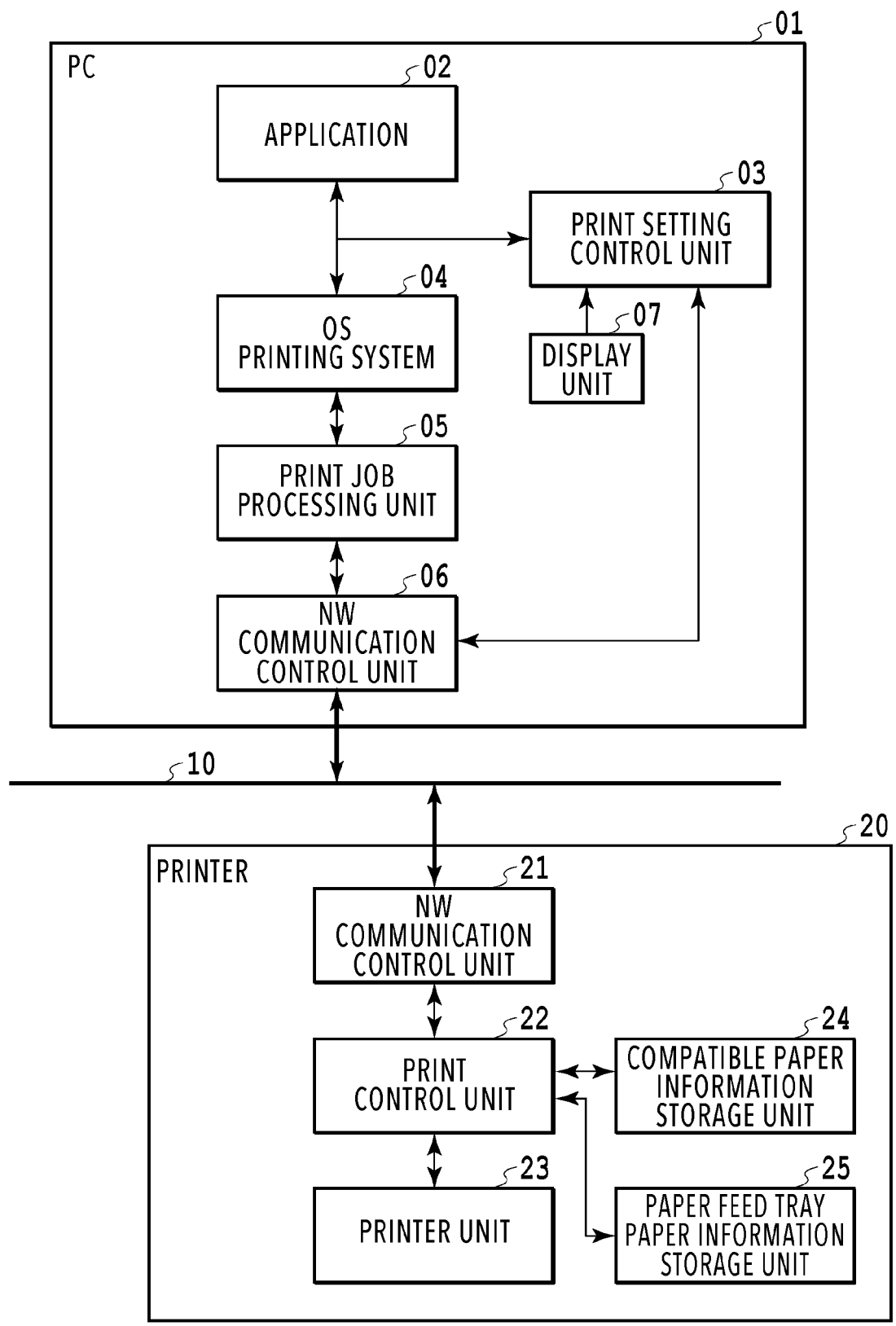
FIG. 1 is a diagram showing an overall configuration of a printing system according to an embodiment of the present invention.

FIG. 1 is a diagram showing an overall configuration of a printing system including an information processing apparatus according to a first embodiment of the present invention. The printing system of this embodiment includes a personal computer (PC) 01 and a printer 20 serving as a printing apparatus. The PC 01 and the printer 20 are connected to each other through a network 10 and are communicable with each other. Although the network is assumed to be a local area network (LAN) in this embodiment, the network may be a wide area network (WAN) instead. Meanwhile, a mode of connection to the network may be in the form of any of a wired network, a wireless network, and a combination of both. The PC 01 controls the printer 20 connected through the network 10. In this embodiment, the PC 01 is assumed to control the printer 20 in accordance with Internet Printing Protocol (hereinafter abbreviated as the IPP).

Although not illustrated in FIG. 1, an operating system (hereinafter abbreviated as the OS) is installed in the PC 01, and resources of the PC 01 such as respective blocks in the PC 01 are managed by the OS. Here, PC 01 has such a hardware configuration that is provided to a general information processing apparatus.

To be more precise, the PC 01 includes a CPU, ROMs, a hard disk, a RAM, various device controllers, and so forth. The CPU executes programs such as the OS and applications, which are stored in a program ROM among the ROMs or read out of the hard disk and loaded into the RAM. Processing shown in respective flowcharts (to be described later) is implemented by execution of these programs. The RAM also functions as a main memory and a work area for the CPU, and so forth. Moreover, the PC 01 also includes an input device such as a keyboard and a pointing device, a display unit 07 such as a display device, a disk controller (DKC) for controlling data access to the hard disk (HD), a flexible disk (FD), and the like storing various data, and so forth. The PC 01 further includes a communication control unit for controlling exchange of signals with the connected printer 20, and so forth. In this embodiment, the macOS (a registered trademark) is assumed to be the OS embedded in the PC 01.

The PC 01 includes functions of an application 02, a print setting control unit 03, an OS printing system 04 (OS standard printing software), a print job processing unit 05, a network (NW) communication control unit 06, and the like. The application 02 is software that creates drawing data based on a user instruction. The application discussed herein is software that can be operated on the OS. Examples of the application 02 include drawing applications such as word processing software for document creation, image editing software, and greeting card creation software. Drawing data created by such a drawing application is data in the portable document format (pdf). While this embodiment explains an example in which the display unit 07 is provided with the PC 01, the display unit 07 may be an external display device instead.

In a case where a user requests printing of the data created by the application 02, the application 02 accepts print setting information including paper setting information that indicates a paper size and a paper type inputted by the user with the print setting control unit 03. Accordingly, in this embodiment, the application 02 and the print setting control unit 03 collectively function as a unit configured to obtain information for designating paper to be used for printing.

The print setting control unit 03 obtains information on paper sheets supported by the printer 20 and information concerning the paper sheets set in paper feed trays of the printer 20 (paper information) from the printer 20 through the NW communication control unit 06. Then, the print setting control unit 03 controls print settings accepted from the user based on the obtained information. Meanwhile, the application 02 sends the OS printing system 04 the print setting information and application data to be printed collectively as a print job.

The OS printing system 04 manages the print job received from the application 02 and sends the print job to the print job processing unit 05 for sequential processing. The print job processing unit 05 creates print data interpretable by the printer 20 from the application data based on the print setting information transmitted from the print setting control unit 03, and transmits the print data to the printer 20 through the NW communication control unit 06.

The printer 20 includes a NW communication control unit 21, a print control unit 22, a printer unit 23, a compatible paper information storage unit 24, and a paper feed tray paper information storage unit 25. The print control unit 22 receives the print data from the PC 01 through the NW communication control unit 21 and causes the printer unit 23 to execute printing by controlling the printer unit 23 based on the print data. In this embodiment, the printer unit 23 includes a printing unit that adopts an inkjet method configured to perform printing by ejecting inks onto a print sheet. The printing unit has such a configuration that performs printing by moving a print head provided with ejection ports for ejecting inks relative to the print sheet. This embodiment adopts a so-called serial-type printer unit 23 which is configured to perform printing on the print sheet by conveying the print sheet fed from the paper feed tray (to be described later) while moving the print head that ejects the inks in a direction intersecting a paper conveyance direction. However, the configuration of the printer unit 23 is not limited only to the foregoing and the present invention is also applicable to printer units adopting other printing modes.

The printer 20 of this embodiment is attachably and detachably provided with two stages of cassettes (hereinafter referred to as a first cassette and a second cassette) serving as the paper feed trays. Meanwhile, the printer unit 23 of the printer 20 can execute printing corresponding to multiple sizes and multiple types of paper sheets by way of control of the print control unit 22. For example, the printer unit 23 can perform printing on various sizes including A4, A5, 3R, postcard, and the like. Meanwhile, the printer unit 23 of the printer 20 can perform printing in accordance with printing modes suitable for various paper types including plain paper, matte coated photo paper, glossy photo paper, postcards, and the like. Information on these compatible paper sizes and paper types is stored in the compatible paper information storage unit 24, and the printer 20 feeds back the compatibility information to the PC 01 as appropriate in response to an inquiry from the PC 01.

The printer 20 is equipped with a function to allow the user to register the information indicating the paper sizes and the paper types set in the respective cassettes. The printer 20 identifies the sizes and the types of paper sheets in the cassettes attached to the printer 20 based on the registered information. Specifically, in the case where the user registers the sizes and the types of the paper sheets in the respective cassettes, the print control unit 22 of the printer 20 associates the registered paper information including the information on the paper sizes and the paper types with the respective cassettes and then stores the associated information in the paper feed tray paper information storage unit 25. The printer 20 identifies the paper size information and the paper type information in the paper information associated with the respective cassettes by using the print control unit 22, and feeds back the paper information including the paper size information and the paper type information to the PC 01 in response to an inquiry from the PC 01. As described above, the print control unit 22 of this embodiment functions as a transmission unit that sends the PC 01 the paper information concerning the paper sheets set in the first cassette and the second cassette, respectively, which are provided to the printer 20. Meanwhile, the print setting control unit 03 of the PC 01 also functions as an obtaining unit configured to obtain the paper information transmitted from this transmission unit.

Figure 2:
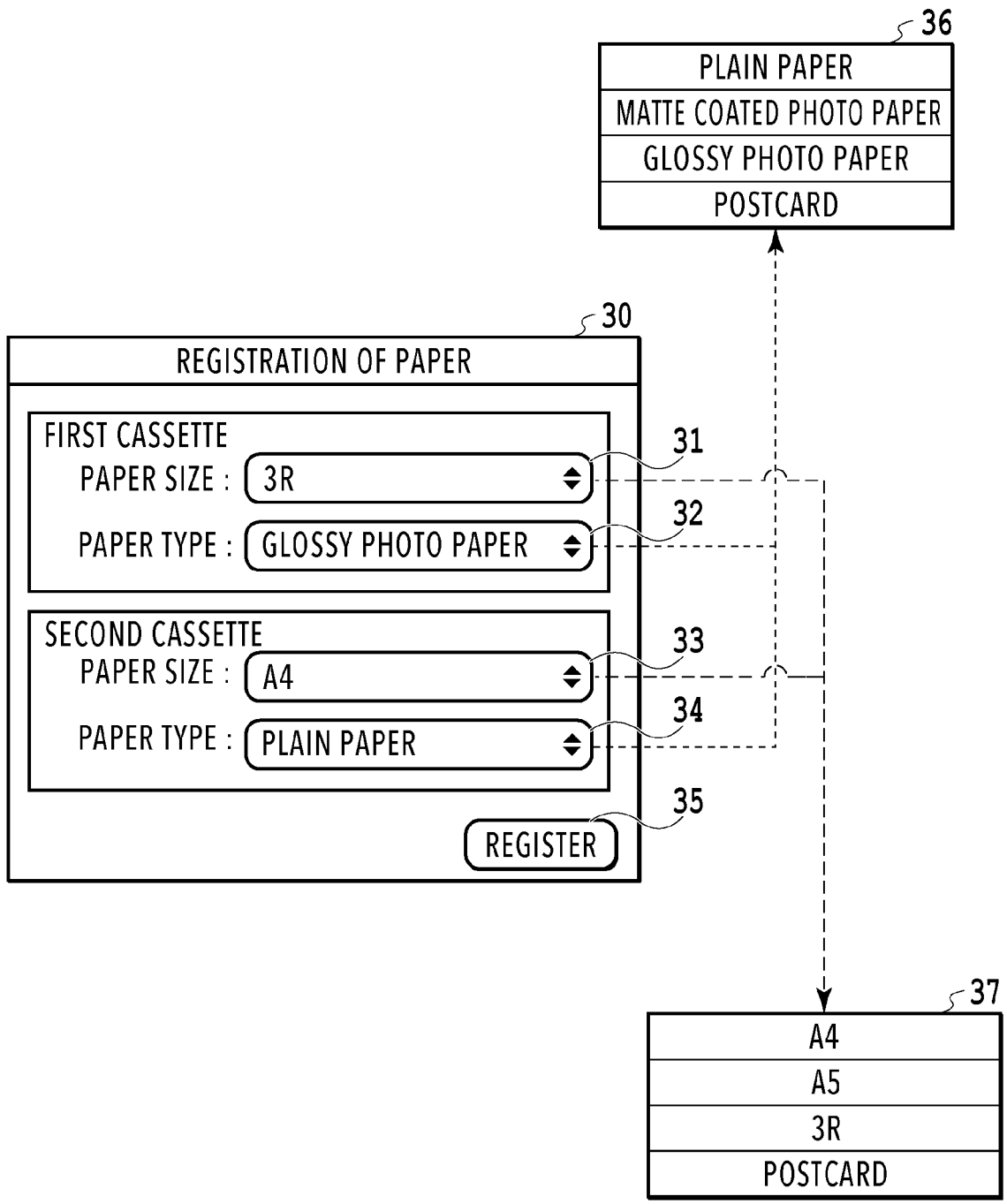
FIG. 2 is a diagram showing a paper registration screen of a printer.

FIG. 2 is a diagram showing a paper registration screen of the printer 20. The printer 20 is equipped with a function to display a paper registration screen 30 for registering the paper size and the paper type in the case where the user sets the paper sheets in each cassette. The printer 20 displays this screen 30 in the case where the printer 20 detects attachment or detachment of each cassette. The user can register the size and the type of the paper set in the first cassette by using a paper size selection pop-up menu 31 and a paper type selection pop-up menu 32. Likewise, the user can register the size and the type of the paper set in the second cassette by using a paper size selection pop-up menu 33 and a paper type selection pop-up menu 34.

The printer 20 can display a list 36 of paper sizes supported by the printer 20 as menu items for the paper size selection pop-up menus 31 and 33. The user can associate one of the paper sizes in this paper size list 36 with each cassette and register this paper size with the printer 20. Meanwhile, the printer 20 can display a list 37 of paper types supported by the printer 20 as menu items for the paper type selection pop-up menus 32 and 34. The user can associate one of the paper types in this paper type candidate list 37 with each cassette and register this paper type with the printer 20. To be more precise, in the case where the user presses a register button 35, the printer 20 stores information indicating the paper sizes and the paper types selected and associated with the respective cassettes on the paper registration screen 30 into the paper feed tray paper information storage unit 25.

Figure 3:
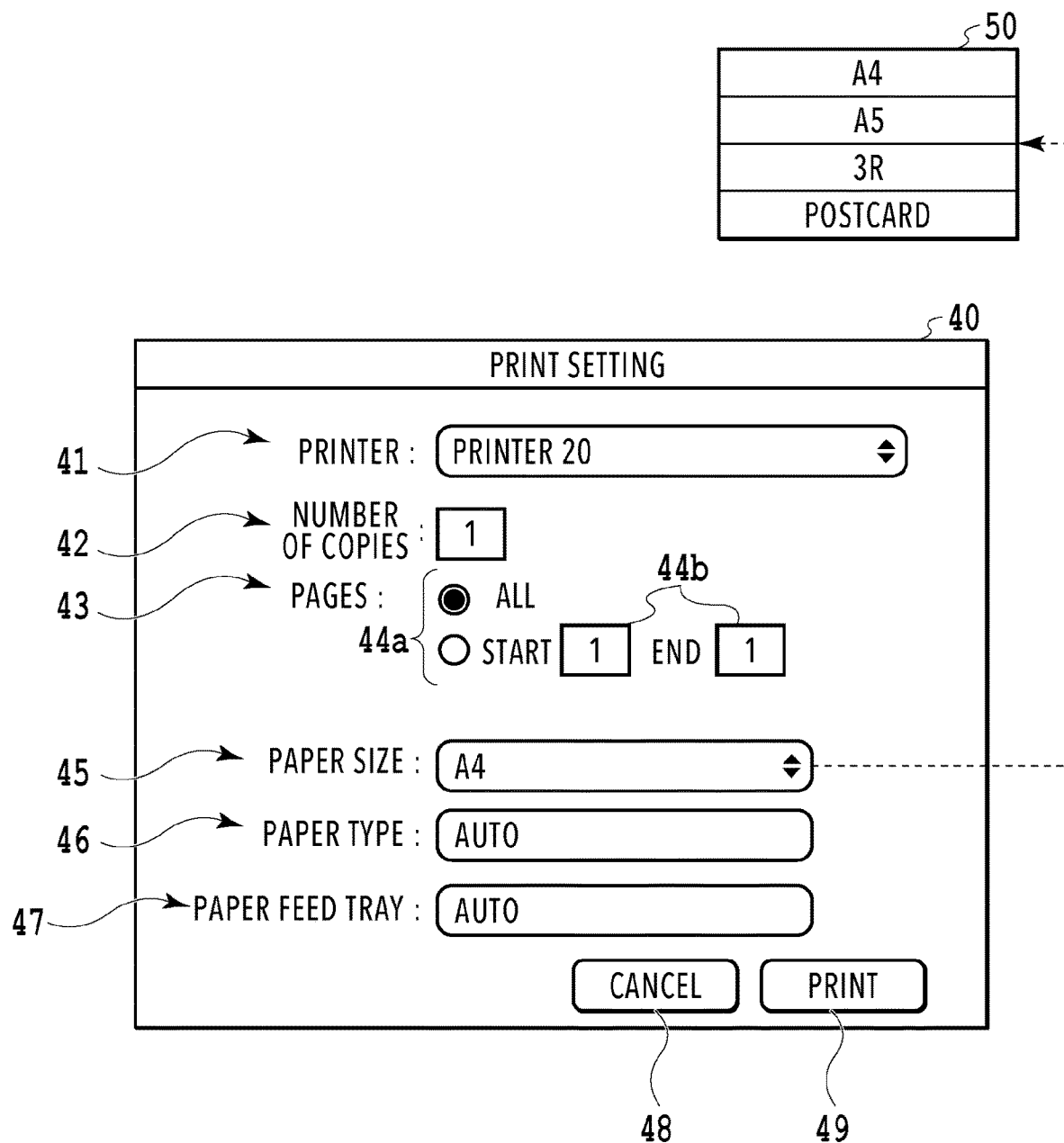
FIG. 3 is a diagram showing a print setting screen of a PC.

FIG. 3 is a diagram showing a print setting screen displayed on the display unit 07 provided to the PC 01.

In the case where the user requests printing of the print data created by using the application 02 in the PC 01, the application 02 causes the display unit 07 of the PC 01 to display a print setting screen 40 through the print setting control unit 03. The print setting screen 40 is provided with a printer selection pop-up menu 41 and this printer selection pop-up menu 41 displays the printer 20 connected to the PC 01. In the case where two or more printers are connected to the PC 01, the user can set the printer to be used out of the printers displayed on the printer selection pop-up menu 41.

Moreover, the print setting screen 40 is provided with a number-of-copies setting text field 42 and a page setting field 43. The user can set the number of copies to be printed by using the number-of-copies setting text field 42. The page setting field 43 is provided with page setting radio buttons 44a and page designation text fields 44b. The page setting radio buttons 44a enable selection of printing all pages and printing designated pages. In the case where the printing of designated pages is selected, the pages to be printed can be set by using the page designation text fields 44b.

Furthermore, the print setting screen 40 is provided with a paper size setting pop-up menu 45, a paper type setting pop-up menu 46, and a paper feed tray setting pop-up menu 47. The user can select the size of the paper to be printed by using the paper size setting pop-up menu 45. Specifically, the print setting control unit 03 can display the list of the paper sizes supported by the printer 20 as menu items of the paper size setting pop-up menu 45. The user can set one of the paper sizes from this paper size list.

Figure 4A:
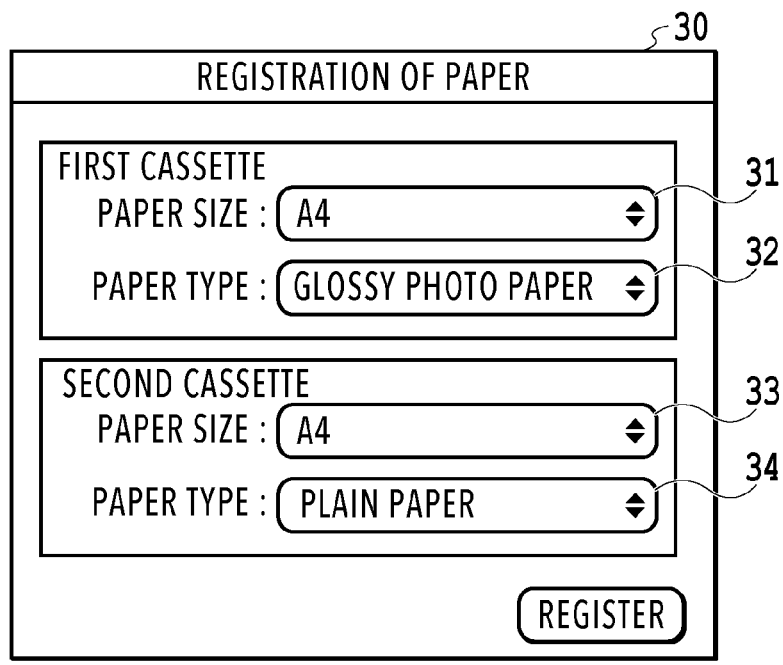
FIGS. 4A and 4B are diagrams showing the paper registration screen of the printer and the print setting screen of the PC.
Figure 4B:
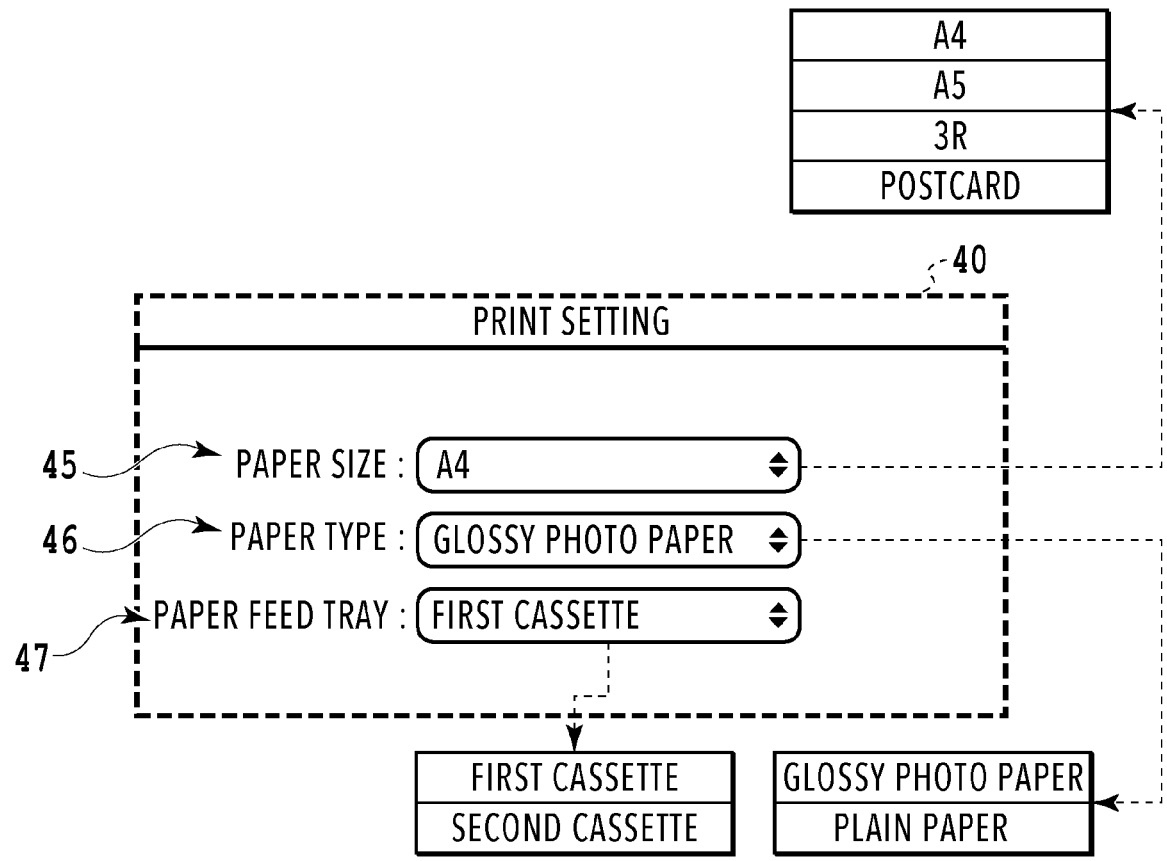

A message "AUTO" meaning that the setting by the user is not required, and the types of paper sheets set in the respective cassettes of the printer 20 are displayed as menu items of the paper type setting pop-up menu 46 (see FIG. 4B). The user can select one of the paper types from the displayed paper types.

A message "AUTO" meaning that the setting by the user is not required, and the cassettes usable in the printer 20 are displayed as menu items of the paper feed tray setting pop-up menu 47. In the case where the usable cassette (which is the first cassette or the second cassette in this embodiment) is displayed on the paper feed tray setting pop-up menu 47, it is possible to set the paper feed tray to be used out of the display paper feed trays.

Back to FIG. 3, the explanation of the print setting screen 40 will be continued. In the case where the user presses a print button 49, the application 02 sends the print job to the OS printing system 04 based on the setting on this screen and then closes the screen. The OS printing system 04 sends the print job to the printer 20 through the print job processing unit 05 and the NW communication control unit 06. On the other hand, in the case where the user presses a cancel button 48, the application 02 closes this screen without sending the print job to the OS printing system 04.

In the case where the paper sheets in different sizes are set in the respective cassettes of the printer 20 (see FIG. 2), the printer 20 automatically selects the cassette in which the paper sheets having the same size as the size selected on the print setting screen 40 are set, and feeds the paper sheet from that cassette. Accordingly, the printer unit 23 forms an image on the paper sheet of the size and the type set by the user and a desired printing result can be obtained. In this case, the user does not have to set the paper type or the paper feed tray (the cassette) on the print setting screen 40. In the meantime, the print setting control unit 03 displays "AUTO" as the menu items on the paper type setting pop-up menu 46 and the paper feed tray setting pop-up menu 47 so as to inform the user that it is not necessary to set the paper type or the paper feed tray (the cassette) (see FIG. 3).

On the other hand, in the case where the paper sheets in the same size but of different types are set in the respective cassettes of the printer 20 (see FIG. 4A), the printer 20 cannot determine the paper feed tray to be used based on the paper size set on the print setting screen 40. In this case, the print setting control unit 03 displays the paper types set in the respective cassettes of the printer 20 on the menu items of the paper type setting pop-up menu 46. In addition, the print setting control unit 03 informs the user that the setting is required by displaying the paper feed trays usable in the printer 20 on the menu items of the paper feed tray setting pop-up menu 47 (see FIG. 4B). Here, the description has been made of the example of notifying the user by displaying both the menu item on the paper type setting pup pop-up menu 46 and the menu item on the paper feed tray setting pop-up menu 47. Instead, the notification to the user may be made by displaying only one of these menus.

Setting states of the paper type setting pop-up menu 46 and the paper feed tray setting pop-up menu 47 are in conjunction with each other. In other words, in the case where the paper type is set on the paper type setting pop-up menu 46, the paper feed tray in which the paper type is set is set on the paper feed tray setting pop-up menu 47. Meanwhile, in the case where the paper feed tray (the cassette) is set on the paper feed tray setting pop-up menu 47, the paper type set in the paper feed tray (the cassette) is set on the paper type setting pop-up menu 46. Based on the paper size and either the paper type or the paper feed tray set on the print setting screen 40, the printer 20 feeds the paper from the paper feed tray in which the paper of the same size and type as the settings is set, and performs the printing in accordance with a printing method suitable for the paper type. In the case of glossy photo paper, the printer 20 performs printing by using a multipass printing method which finishes an image to be formed by scanning the same region on a print sheet several times with the print head, for example. On the other hand, in the case of rapid printing on plain paper or the like, the printer 20 performs printing by using a so-called one-pass printing method which finishes an image by scanning respective regions on a print sheet just once with the print head, for instance.

Figure 5A:
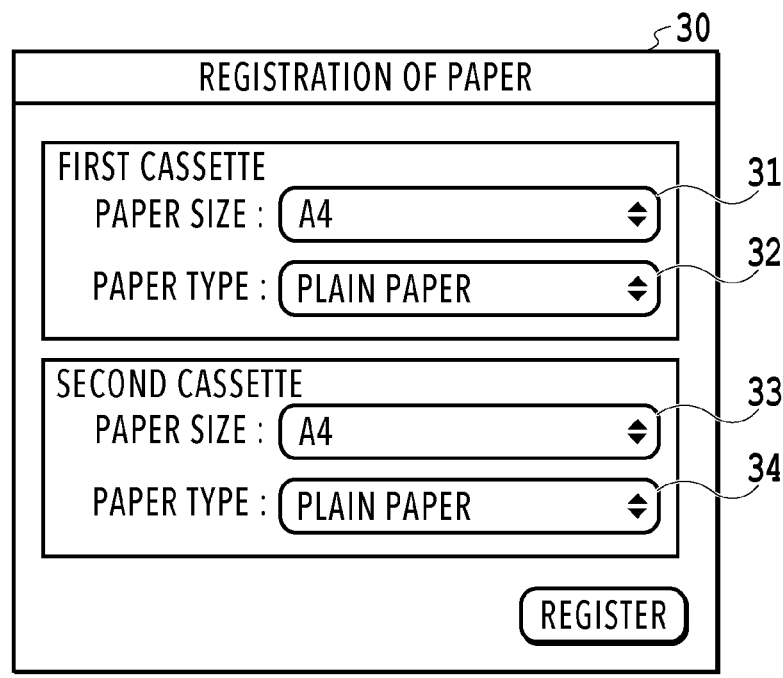
FIGS. 5A and 5B are diagrams showing the paper registration screen of the printer and the print setting screen of the PC.
Figure 5B:
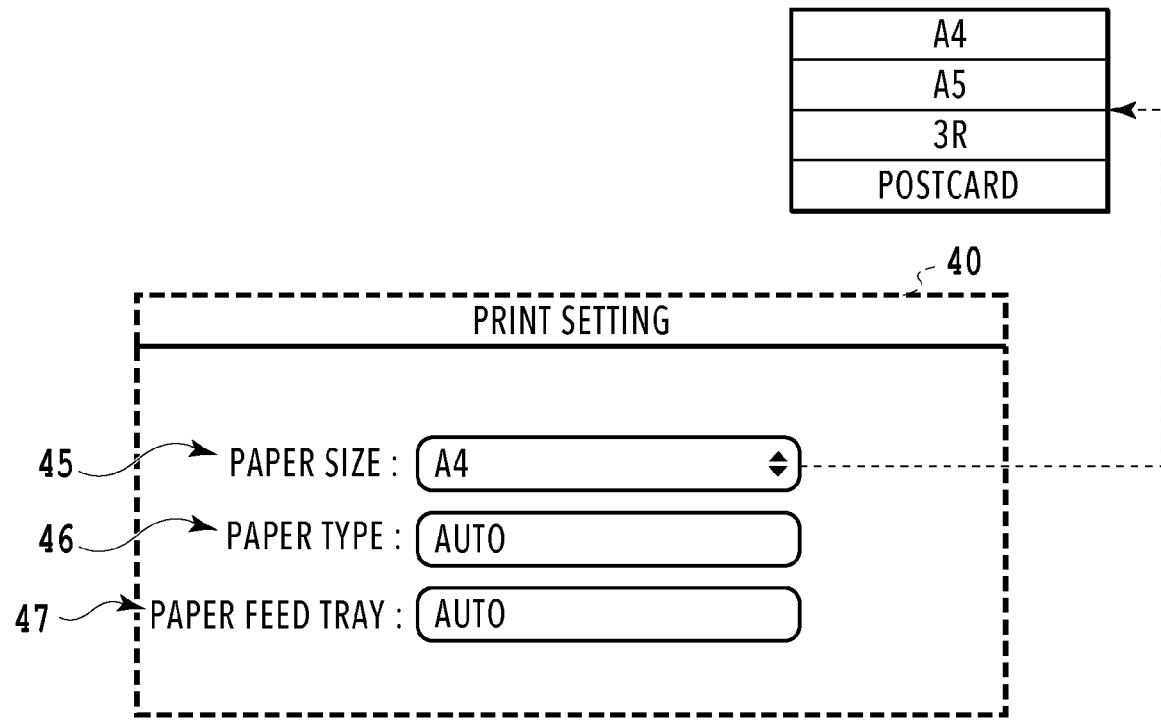

Meanwhile, in the case where the paper sheets in the same size and of the same type are set in the paper feed trays of the printer 20 (see FIG. 5A), the printer 20 cannot determine the paper feed tray to be used based on the paper size set on the print setting screen 40. In other words, the printer 20 cannot determine whether it is appropriate to select the first cassette or the second cassette as the paper feed tray. However, a result of output will be the same no matter which cassette the paper sheet is fed out of. Accordingly, the printer 20 feeds the paper out of an arbitrary one of the paper feed trays and performs printing in accordance with the printing method suitable for the paper type. As a consequence, the user does not have to set the paper type or the paper feed tray on the print setting screen 40. In this case, the print setting control unit 03 displays the messages "AUTO" as the menu items on the paper type setting pop-up menu 46 and the paper feed tray setting pop-up menu 47 so as to inform the user that the setting is not required (see FIG. 5B). In this embodiment, in the case where the paper sheets in the same size and of the same type are set both in the first cassette and in the second cassette of the printer 20, the printer 20 uses the first cassette preferentially.

Figure 6:
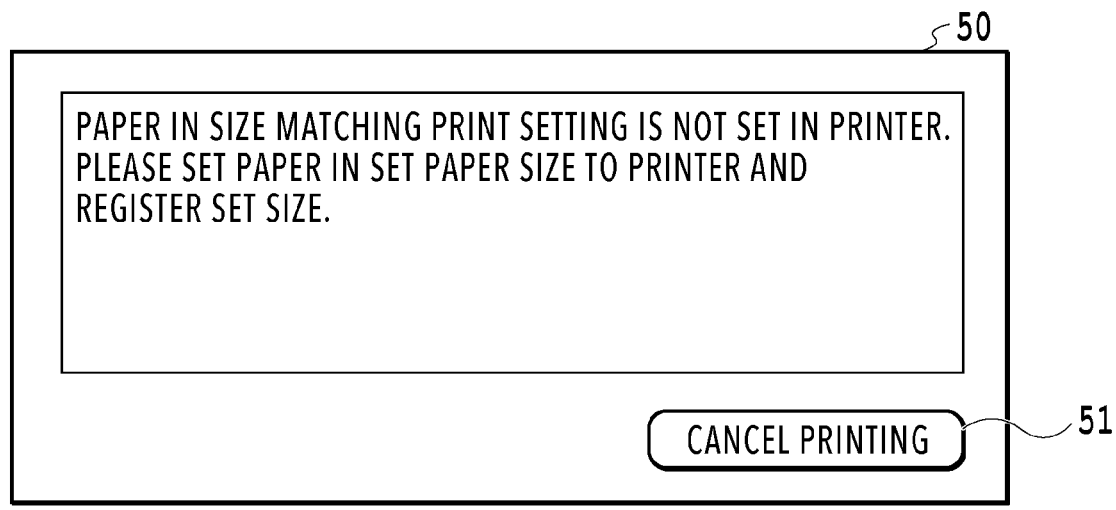
FIG. 6 is a diagram showing a paper size error screen of the PC.

FIG. 6 is a diagram showing a paper size error screen to be displayed on the display unit 07 by the print job processing unit 05 in the case where the paper in the size set on the print setting screen 40 is not set in any of the cassettes of the printer 20. In the case where the printer 20 receives the print job from the print job processing unit 05 of the PC 01, the printer 20 transmits a paper size error to the print job processing unit 05 of the PC 01 if the paper in the size designated in the print job is not set in any of the cassettes. Upon receipt of the paper size error from the printer 20, the print job processing unit 05 displays a paper size error screen 50 shown in FIG. 6 on the display unit 07, thereby notifying the user of the paper size error. FIG. 6 shows an example of displaying notification that the paper in the size set on the print setting screen is not set in the printer and displaying suggestion for setting the paper in the set size in the printer 20 and registering the set size.

In the case where the user sets the paper in the size set on the print setting screen 40 and registers the paper size on the paper registration screen 30 in compliance with the paper size error screen 50, the printer 20 resets the paper size error and conducts print processing. On the other hand, if the user presses a print cancel button 51, the print job processing unit 05 instructs the printer 20 to cancel the printing and terminates the print processing. Details of this processing will be described later.

Figure 7:
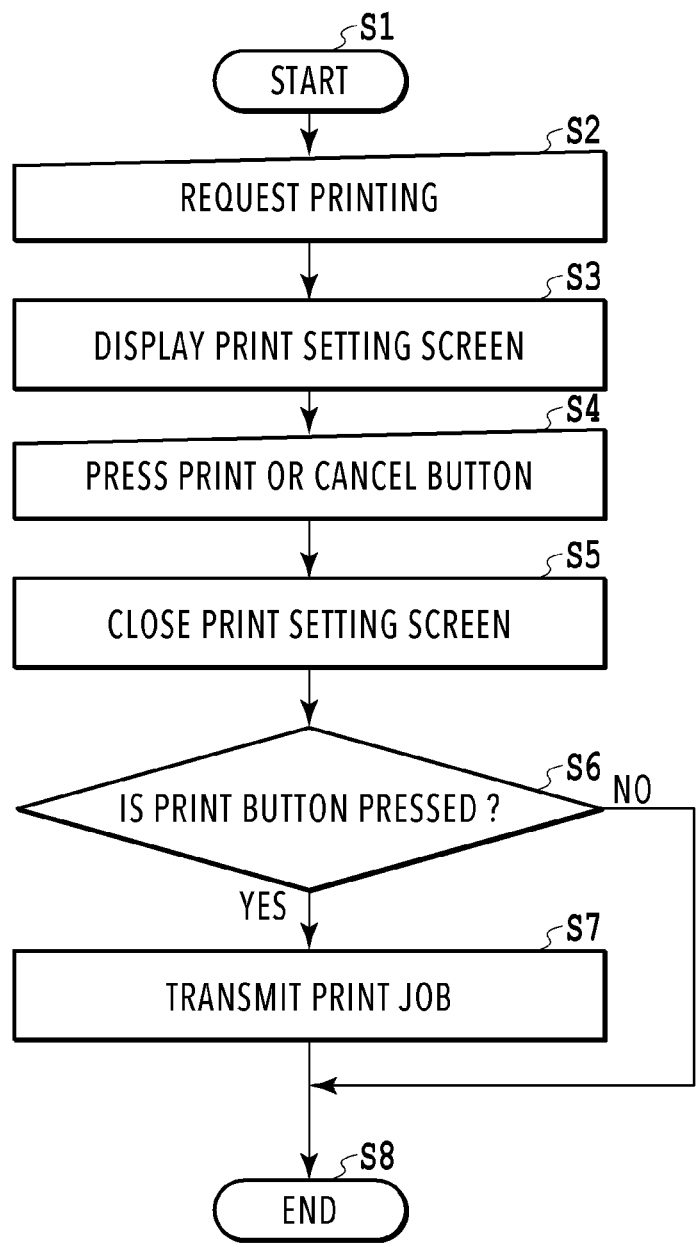
FIG. 7 is a flowchart showing print processing of an application.

FIG. 7 is a flowchart showing procedures of the print processing to be executed by the application 02. Note that a code S attached to a step number in each processing in the flowchart referred to in conjunction with the description of this specification stands for the step.

In the case where the user requests printing of the data created by the application 02 (S2), the application 02 causes the display unit 07 to display the print setting screen 40 through the print setting control unit 03. Based on the paper information on the paper supported by the printer 20 and on the paper information on the paper set in the paper feed trays, the print setting control unit 03 displays the print setting screen 40 after determining the respective menu items on the respective pop-up menus 45, 46, and 47. Details of this processing will be described later.

Thereafter, in the case where the user presses the print button 49 or the cancel button 48 (S4), the application 02 closes the print setting screen 40 through the print setting control unit 03 (S5). In S6, the application 02 determines whether or not the print button 49 is pressed in S4. If the application 02 determines that the print button 49 is pressed, the application 02 obtains information indicating the setting states on the print setting screen 40 through the print setting control unit 03. Then, the application 02 sends the OS printing system 04 the obtained information and the data created by using the application 02 collectively as the print job. Accordingly, the processing from the request of printing by the user to the transmission of the print job to the printer 20 is terminated (S8). On the other hand, in the case where the application 02 determines in S6 that the cancel button 48 is pressed, the application 02 proceeds to S8 and terminates the print processing.

Figure 8:
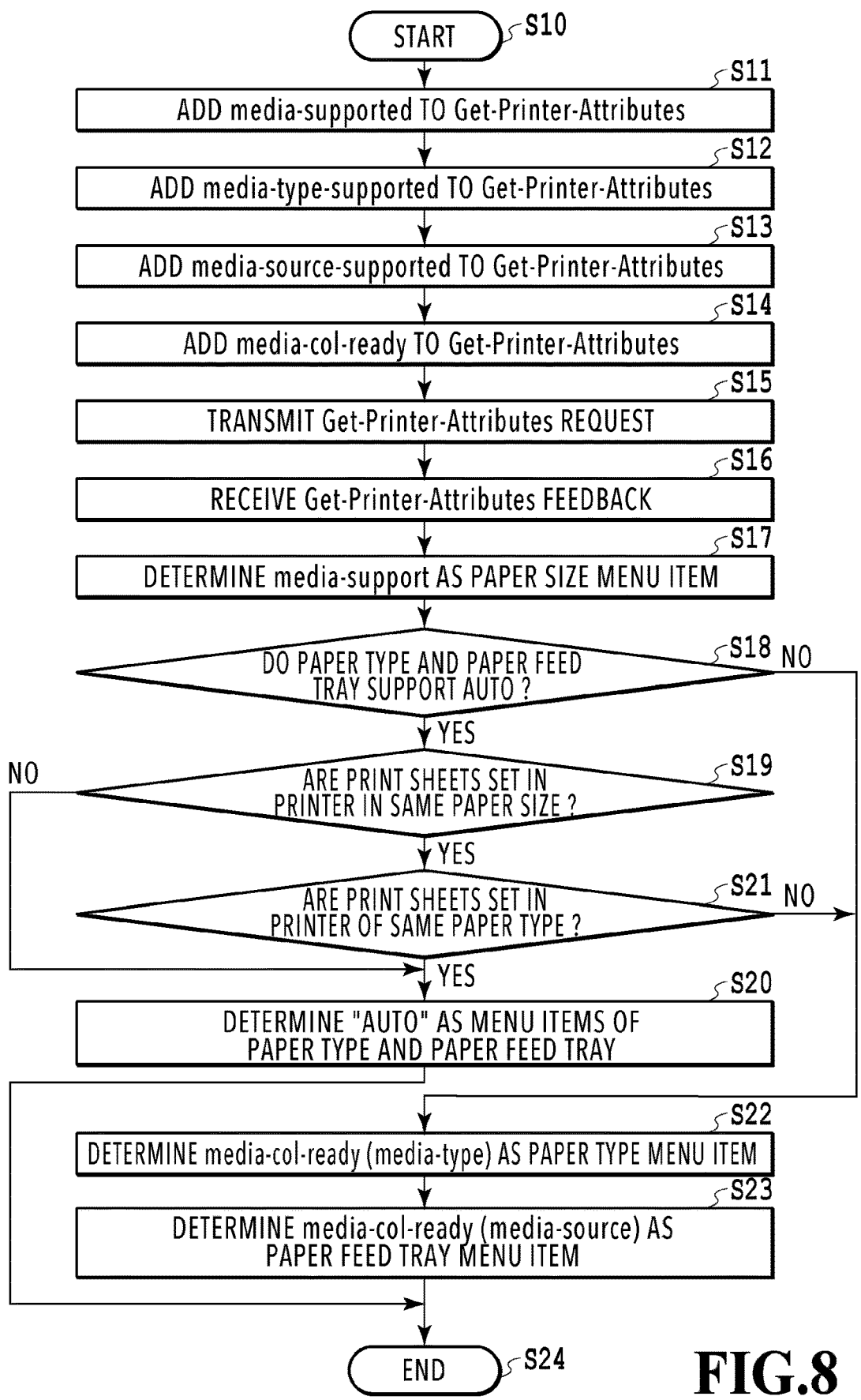
FIG. 8 is a flowchart showing menu item determination processing of a print setting control unit.

FIG. 8 is a flowchart showing menu item determination processing to be executed by the print setting control unit 03 of the PC 01 in the processing shown in (S3) in FIG. 7 (display processing of the print setting screen 40).

The print setting control unit 03 obtains the paper information supported by the printer 20 and the information on the paper set in the paper feed trays by using a printer information obtaining request (Get-Printer-Attributes) in accordance with the IPP. Then, the print setting control unit 03 determines the menu items on the paper size setting pop-up menu 45, the paper type setting pop-up menu 46, and the paper feed tray setting pop-up menu 47 on the print setting screen 40 based on the obtained paper information. Now, the processing will be described more specifically with reference to the flowchart of FIG. 8.

In S11, the print setting control unit 03 adds supported paper sizes (media-supported) as attribute information to be obtained by using the printer information obtaining request. In S12, the print setting control unit 03 adds supported paper types (media-type-supported) as the attribute information to be obtained by using the printer information obtaining request. In S13, the print setting control unit 03 adds supported paper feed trays (media-source-supported) as the attribute information to be obtained by using the printer information obtaining request. In S14, the print setting control unit 03 adds the information (media-col-ready) on the paper set in the paper feed trays as the attribute information to be obtained by using the printer information obtaining request.

Next, in S15, the print setting control unit 03 transmits the above-mentioned information obtaining request to the printer 20. Upon receipt of the printer information obtaining request, the print control unit 22 of the printer 20 feeds back the printer information (printing apparatus information) stored in the compatible paper information storage unit 24 and the print setting control unit 03 receives the printer information (S16).

Here, examples of the printer information fed back from the printer 20 are shown in FIGS. 9A to 9D. The printer 20 feeds back the information on the supported paper sizes, the supported paper types, the supported paper feed trays, and the like shown in FIG. 9A as the printer information to be fed back to the PC 01. In the illustrated example, A4, A5, 3R, postcard, and the like are determined as the supported sizes (media-type-supported).

Meanwhile, the supported paper types include "AUTO", which means that the printer 20 can automatically determine the paper type based on the paper size, as well as the paper types supported by the printer 20. The plain paper, the matte coated photo paper, the glossy photo paper, the postcards, and the like are determined as the paper types supported by the printer 20.

In addition, the supported paper feed trays (media-source-supported) include "AUTO", which means that the printer 20 can automatically determine the paper feed tray based on the paper size, as well as the paper feed trays (the first cassette and the second cassette) supported by the printer 20.

In the meantime, the printer 20 feeds back registration information shown in FIGS. 9B, 9C, and 9D, for example, corresponding to the paper set in the paper feed trays as paper feed tray paper information (media-col-ready). FIG. 9B shows an example in which the paper sheets in different sizes and of different types are set in the first cassette and the second cassette, respectively. FIG. 9C shows an example in which the paper sheets in the same size and of the same type are set in the first cassette and the second cassette, respectively. FIG. 9D shows an example in which the paper sheets in the same size but of different types are set in the first cassette and the second cassette, respectively.

Now, the description will go back to the processing shown in the flowchart of FIG. 8. In S17, the print setting control unit 03 defines the supported paper sizes (media-supported) included in the printer information received in S16 as the menu items on the paper size setting pop-up menu 45. Next, in S18, the print setting control unit 03 determines whether or not "AUTO" is included in both the supported paper types (media-type-supported) and the supported paper feed trays (media-source-supported) in the printer information received in S16. The print setting control unit 03 proceeds to S19 in the case where the print setting control unit 03 determines that "AUTO" is included in the supported paper types and in the supported paper feed trays (YES).

In S19, the print setting control unit 03 determines whether or not the sizes of the paper sheets set in the first cassette and the second cassette of the printer 20 are the same based on the paper feed tray paper information (media-col-ready) included in the printer information received in S16. The print setting control unit 03 proceeds to S20 in the case where the sizes of the paper sheets set in these cassettes are determined to be different (NO). In S20, the print setting control unit 03 determines that the paper feed tray to be used can be determined based on the paper size since the paper sheets in different sizes are set in the first cassette and the second cassette of the printer 20, respectively. Thereafter, the print setting control unit 03 defines "AUTO" as the menu items of the paper type setting pop-up menu 46 and the paper feed tray setting pop-up menu 47, and then proceeds to S24 to terminate the processing.

Meanwhile, the print setting control unit 03 proceeds to S21 in the case of the determination that the paper sheets in the same size are set in the first cassette and the second cassette, respectively, in S19. In S21, the print setting control unit 03 determines whether or not the paper sheets set in the first cassette and the second cassette of the printer 20 are of the same paper type based on the paper feed tray paper information (media-col-ready) included in the printer information received in S16. The print setting control unit 03 proceeds to S20 in the case where the paper sheets are determined to be of the same paper type (YES). In the case where the paper sheets in the same size and of the same type are set in the first cassette and the second cassette, respectively, the result of output will be the same no matter which cassette the paper is fed out of. For this reason, the printer 20 can use any one of the cassettes as the paper feed tray. Accordingly, the print setting control unit 03 determines that it is possible to determine the cassette to be used by the printer 20, sets "AUTO" as the menu items on the paper type setting pop-up menu 46 and the paper feed tray setting pop-up menu 47, and then proceeds to S24 to terminate the processing. Note that the printer 20 is configured to use the first cassette preferentially in this embodiment in the case where any one of the paper feed trays can be used.

On the other hand, in the case where the print setting control unit 03 determines in S21 that the types of the paper sheets set in the first cassette and the second cassette are different (NO), the paper sheets in the same size but of the different types are set in these cassettes of the printer 20, respectively. For this reason, the print setting control unit 03 cannot determine the cassette to be used depending on the paper size. As a consequence, the print setting control unit 03 performs processing in S22. In S22, the print setting control unit 03 sets the menu item on the paper type setting pop-up menu 46 to the paper type (media-type) of the paper feed tray paper information (media-col-ready) included in the printer information received in S16 instead of "AUTO". Thereafter, the print setting control unit 03 proceeds to S24 and terminates the processing.

Next, in S23, the print setting control unit 03 sets the menu item on the paper feed tray setting pop-up menu 47 to the paper feed tray (media-source) of the paper feed tray paper information included in the printer information received in S16 instead of "AUTO". Thereafter, the print setting control unit 03 proceeds to S24 and terminates the processing.

Meanwhile, in the case where it is determined in S18 that "AUTO" is not included in the supported paper information (media-type-supported) or in the supported paper feed trays (media-source-supported) received in S16, the print setting control unit 03 proceeds to S22 and S23. In S22, the print setting control unit 03 sets the menu item on the paper type setting pop-up menu 46 to the paper type (media-type) of the paper feed tray paper information (media-col-ready) included in the printer information received in S16. Meanwhile, in S23, the print setting control unit 03 sets the menu item on the paper feed tray setting pop-up menu 47 to the paper feed tray (media-source) of the paper feed tray paper information (media-col-ready) included in the printer information received in S16. Thereafter, the print setting control unit 03 proceeds to S24 and terminates the processing.

Figure 10:
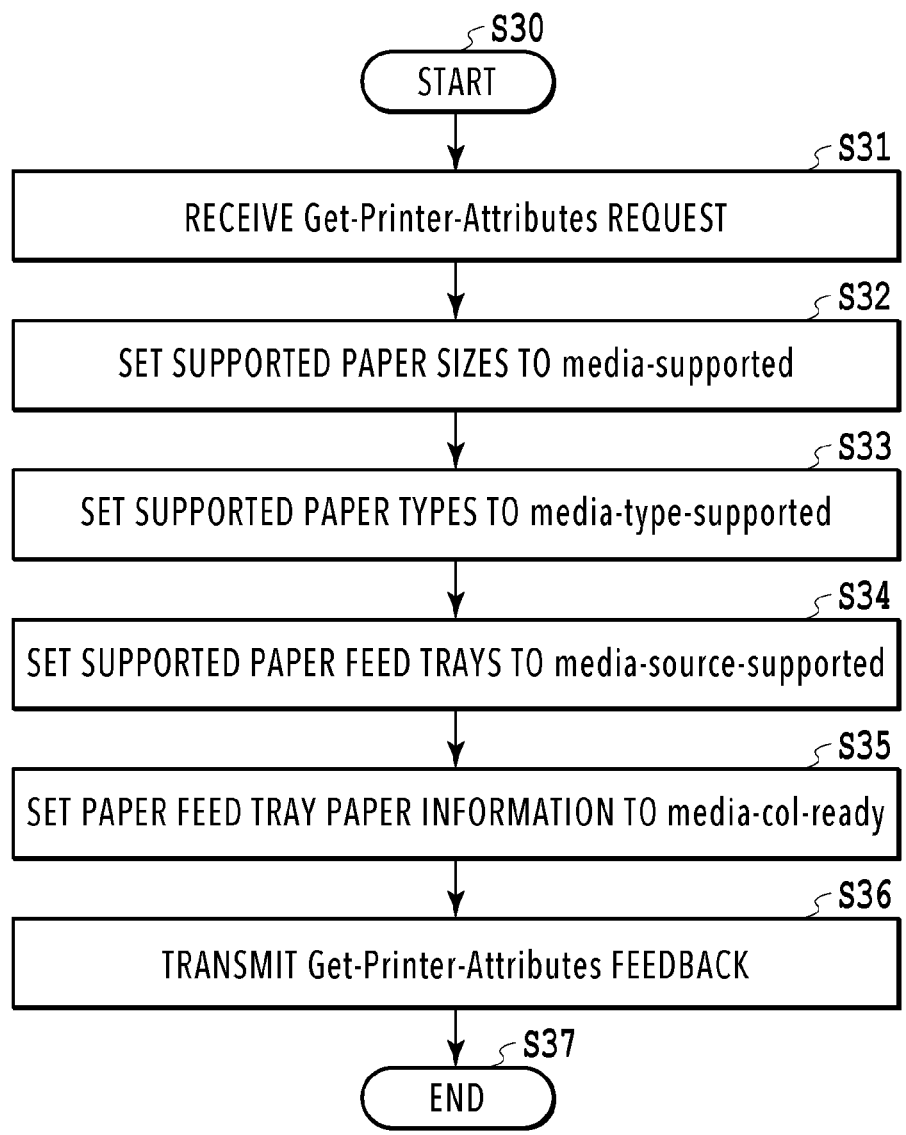
FIG. 10 is a flowchart showing feedback processing of the printer.

FIG. 10 is a flowchart showing processing of feedback by the print control unit 22 of the printer 20 in response to the printer information obtaining request received from the print setting control unit 03 of the PC 01. In this processing, the print control unit 22 feeds back the paper information supported by the printer 20 and the information on the paper set in the paper feed trays (the first cassette and the second cassette). Specifically, in S31 of FIG. 10, the print control unit 22 receives the printer information obtaining request (Get-Printer-Attributes). Subsequently, in S32, the print control unit 22 sets supported paper sizes 60 shown in FIG. 9A to the supported paper sizes (media-supported) to be fed back.

In S33, the print control unit 22 sets supported paper types 61 shown in FIG. 9A to the supported paper types (media-type-supported) to be fed back. The print control unit 22 incorporates "AUTO", which means that the printer 20 can automatically determine the paper type based on the paper size, into the supported paper types (media-type-supported) to be fed back.

In S34, the print control unit 22 sets supported paper feed trays 62 shown in FIG. 9A to the supported paper feed trays (media-source-supported) to be fed back. The print control unit 22 incorporates "AUTO", which means that the printer 20 can automatically determine the paper feed tray based on the paper size, into the supported paper feed trays (media-source-supported) to be fed back.

Next, in S35, the print control unit 22 sets pieces of the registration information, which are set corresponding to the paper sheets set in the first cassette and the second cassette serving as the paper feed trays, respectively, to the paper feed tray paper information (media-col-ready) to be fed back. Examples of the registration information include the pieces of the information shown in FIGS. 9B, 9C, and 9D. Thereafter, in S36, the print control unit 22 transmits the support information set in S31 to S34 and the paper feed tray paper information (the registration information) set in the S36 to the print setting control unit 03 of the PC 01 through the NW communication control units 21 and 06. Then, print control unit 22 proceeds to S37 and terminates the processing.

Figure 11:
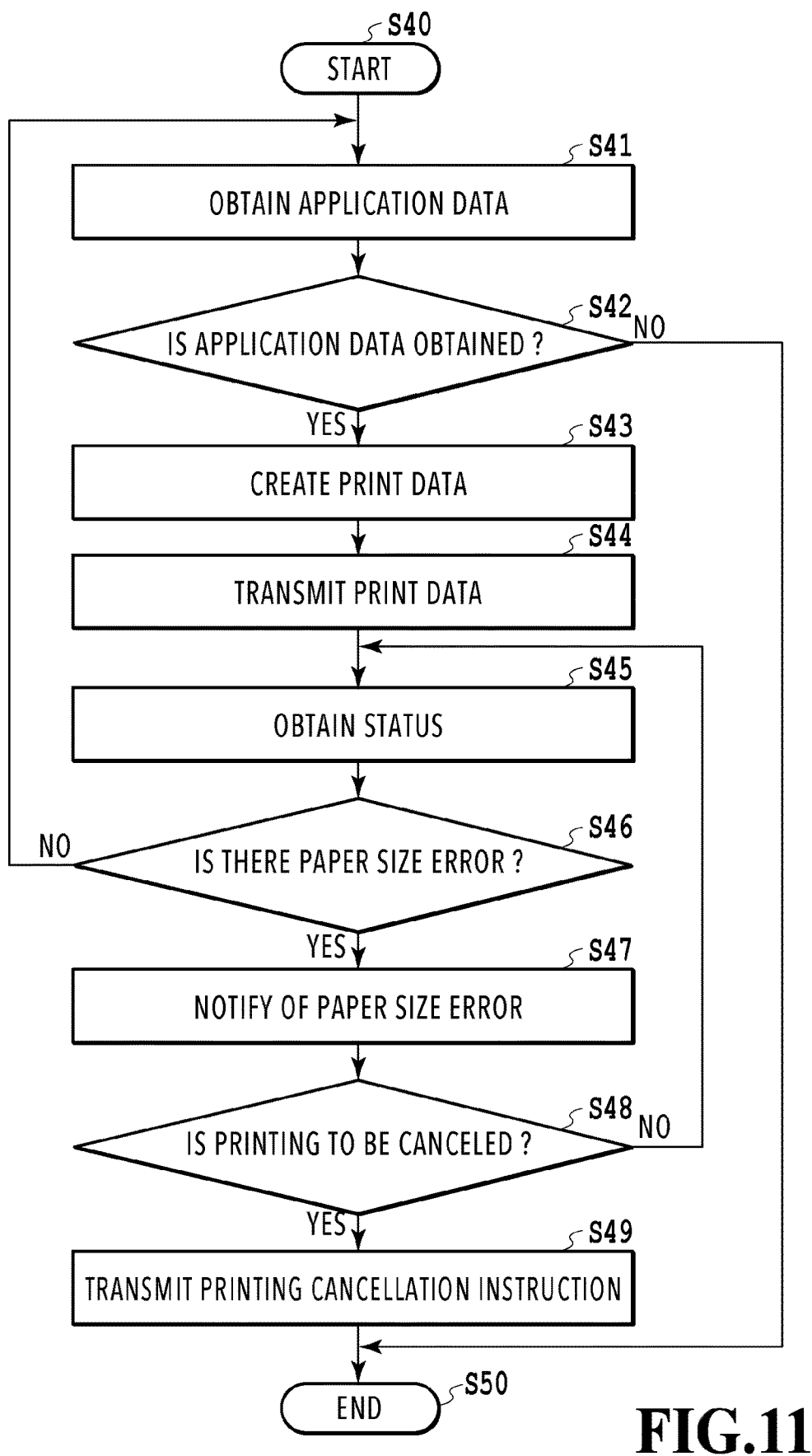
FIG. 11 is a flowchart showing print data transmission processing of a print job processing unit.

FIG. 11 is a flowchart showing print data transmission processing to be executed by the print job processing unit 05. In the case where the OS printing system 04 transmits the print job to the print job processing unit 05, the print job processing unit 05 starts the processing and proceeds to S41. In S41, the print job processing unit 05 attempts to obtain the application data from the OS printing system 04. In S42, the print job processing unit 05 determines whether or not the application data to be printed is obtained. In the case where the application data to be printed is obtained, the print job processing unit 05 proceeds to S43 and creates the print data interpretable by the printer 20 based on the application data. In S44, the print job processing unit 05 transmits the created print data to the printer 20.

In S45, the print job processing unit 05 obtains a status of the printer 20 and checks the presence or absence of occurrence of the paper size error. In S46, the print job processing unit 05 determines whether or not the paper size error occurs in the printer 20. Here, if the print job processing unit 05 determines that the paper size error does not occur, the print job processing unit 05 returns to S41 and repeats obtaining of the application data from the OS printing system 04 as well as creation and transmission of the print data. Meanwhile, if the print job processing unit 05 determines in S42 that there is no application data to be printed, the print job processing unit 05 proceeds to S50 and terminates the processing.

On the other hand, in the case where the print job processing unit 05 determines the occurrence of the paper size error in S46, the print job processing unit 05 proceeds to S47 and notifies the user of the paper size error by displaying the paper size error screen 50 shown in FIG. 6. Thereafter, in S48, the print job processing unit 05 determines whether or not the print cancel button 51 on the paper size error screen 50 is pressed. In the case where the print job processing unit 05 determines that the print cancel button 51 is not pressed, the print job processing unit 05 returns to S45 and repeats obtaining the state from the printer 20 as well as the check of the presence or absence of occurrence of the paper size error. In the case there the print job processing unit 05 determines in S48 that the print cancel button 51 is pressed, the print job processing unit 05 proceeds to S49 to instruct the printer 20 to cancel the printing and then terminates the processing.

This embodiment has described the example in which only "AUTO" is displayed as the menu items on the paper type setting pop-up menu 46 and the paper feed tray setting pop-up menu 47 on the print setting screen 40 in the case where the paper type and the paper feed tray can automatically be determined based on the designated paper size. However, the paper types set in the paper feed trays of the printer 20 and the usable paper feed trays may be displayed in addition to the display of "AUTO" as the menu items of the respective pop-up menus 46 and 47.

In this case, the print setting control unit 03 sets "AUTO" as the menu item on the paper type setting pop-up menu 46 in S20 of FIG. 8, and also sets the paper type (media-type) of the paper feed tray paper information (media-col-ready) received in S16. In this way, "AUTO" is displayed as the menu item in an initial state on the paper type setting pop-up menu 46 on the print setting screen 40 and the paper types set in the paper feed trays of the printer 20 are also displayed thereon. Meanwhile, the print setting control unit 03 sets "AUTO" as the menu item on the paper feed tray setting pop-up menu 47 in S20 of FIG. 8, and also sets the paper feed tray (media-source) of the paper feed tray paper information (media-col-ready) received in S16. In this way, "AUTO" is displayed as the menu item in an initial state on the paper feed tray setting pop-up menu 47 on the print setting screen 40 and the paper feed trays usable by the printer 20 are also displayed thereon. Accordingly, even in the case where it is possible to automatically determine the paper type and the paper feed tray, the user can still check the paper types set in the respective paper feed trays in the printer 20 and the usable paper feed trays on the print setting screen 40 so as to secure reliability of setting operations.

Meanwhile, this embodiment has described the example in which the setting of the paper type or the paper feed tray is not required in the case where the paper sheets in the same size and of the same type are set in the first cassette and the second cassette of the printer 20. However, it is also possible to configure in such a way as to require the setting of the paper type or the paper feed tray even in the case where the paper sheets in the same size and of the same type are set in the respective cassettes as with the case where the paper sheets in the same size and of the same type are set in these cassettes.

This configuration can be implemented by carrying out the following processing. Specifically, the print setting control unit 03 proceeds to S22 and S23 in the case where the print setting control unit 03 determines in S19 of FIG. 8 that the paper sheets set in the first cassette and the second cassette are in the same size. Then, in S22 and S23, the paper type (media-type) and the paper feed tray (media-source) received in S16 are set to the respective menu items on the paper type setting pop-up menu 46 and the paper feed tray setting pop-up menu 47. Thereafter, the user selects a certain paper type or cassette from the menu items on the respective pop-up menus 46 and 47.

As described above, according to this embodiment, if the printer can determine the cassette based on the information on the paper set in the paper feed trays (the first cassette and the second cassette), then it is possible to obtain a desired printing result by automatically supplying appropriate paper from the determined cassette. As a consequence, the user is not requested to perform a setting operation or a check which are not required. Meanwhile, in the case where the printer cannot determine the cassette based on the paper size designated by the user, the printer notifies the user of the request for the setting of the paper type or the tray. This makes it possible to reduce a risk of printing on unintended paper. As described above, according to this embodiment, it is possible to select the tray appropriately by performing a minimum setting operation and thus to enhance efficiency in the setting operation.

Second Embodiment

Next, a second embodiment of the present invention will be described. The first embodiment has described the example of causing the print setting control unit 03 of the PC 01 to determine whether or not it is possible to automatically determine the cassette to be used, or in other words, to determine the necessity of setting not only the paper size but also any of the paper type and the paper feed tray. On the other hand, in the second embodiment, the print control unit 22 of the printer 20 performs the same determination. Note that the configurations and the processing shown in FIGS. 1 to 7 and described in the first embodiment are the same in this embodiment and overlapping explanation will therefore be omitted.

Figure 13A:
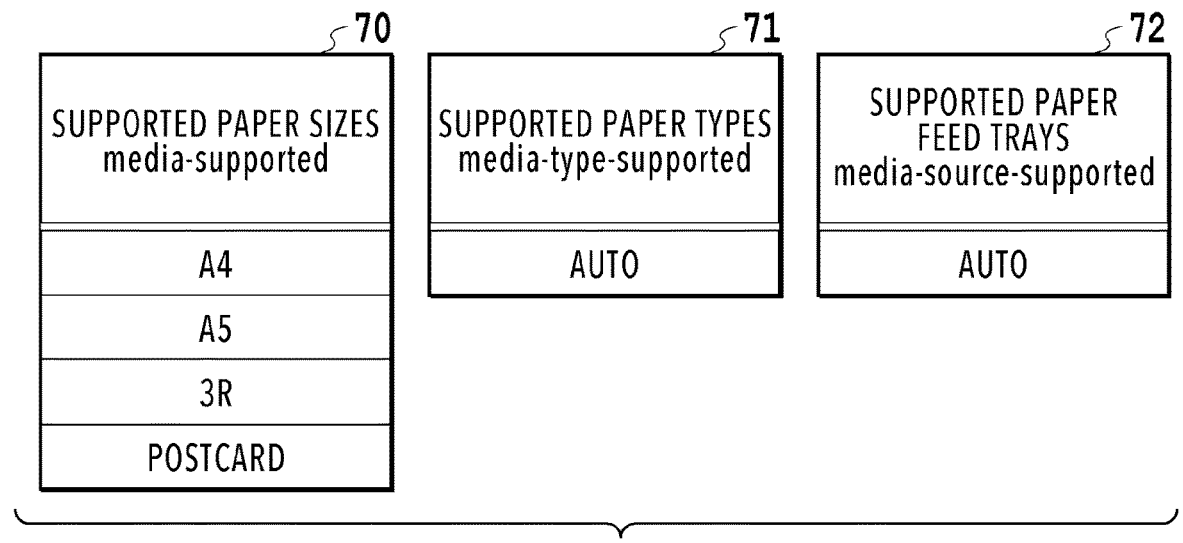
FIGS. 13A and 13B are diagrams showing examples of the printer information fed back from the printer.
Figure 13B:
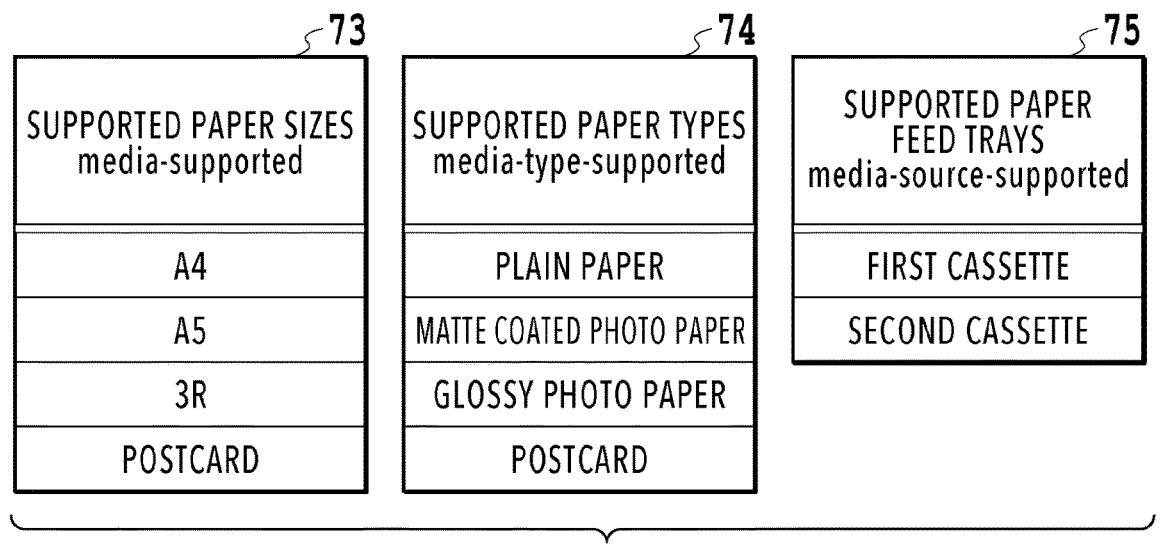

In the above-described first embodiment, in the case where the paper size is designated, the print control unit 22 performs the feedback while always incorporating "AUTO", which means that the printer 20 can automatically determine the paper type or the paper feed tray, into the supported paper types or and the supported paper feed trays (see FIG. 9A). On the other hand, in this embodiment, the print control unit 22 feeds back the information on the paper supported by the printer 20 and the information on the paper set in the paper feed trays (the first cassette and the second cassette) to the PC 01 upon receipt of the printer information obtaining request. FIGS. 13A and 13B show examples of the printer information to be fed back by the printer 20 in the second embodiment.

In the second embodiment, in the case where the print control unit 22 can automatically determine the paper type or the paper feed tray (the first cassette or the second cassette) in accordance with the designation of the paper size, the print control unit 22 feeds back only "AUTO" as the supported paper type (media-type-supported) or as the supported paper feed tray (media-source-supported) as shown in FIG. 13A. Meanwhile, in the case where it is not possible to automatically determine the paper type or the paper feed tray in response to the designation of the paper size set to (registered with) the paper feed tray, the print control unit 22 feeds back the supported paper types (media-type-supported) or the supported paper feed tray (media-source-supported) without incorporating "AUTO". In other words, as shown in FIG. 13B, the print control unit 22 feeds back the paper types set to (registered with) the paper feed trays and the usable paper feed trays as the supported paper types (media-type-supported) or the supported paper feed trays (media-source-supported).

Figure 12:
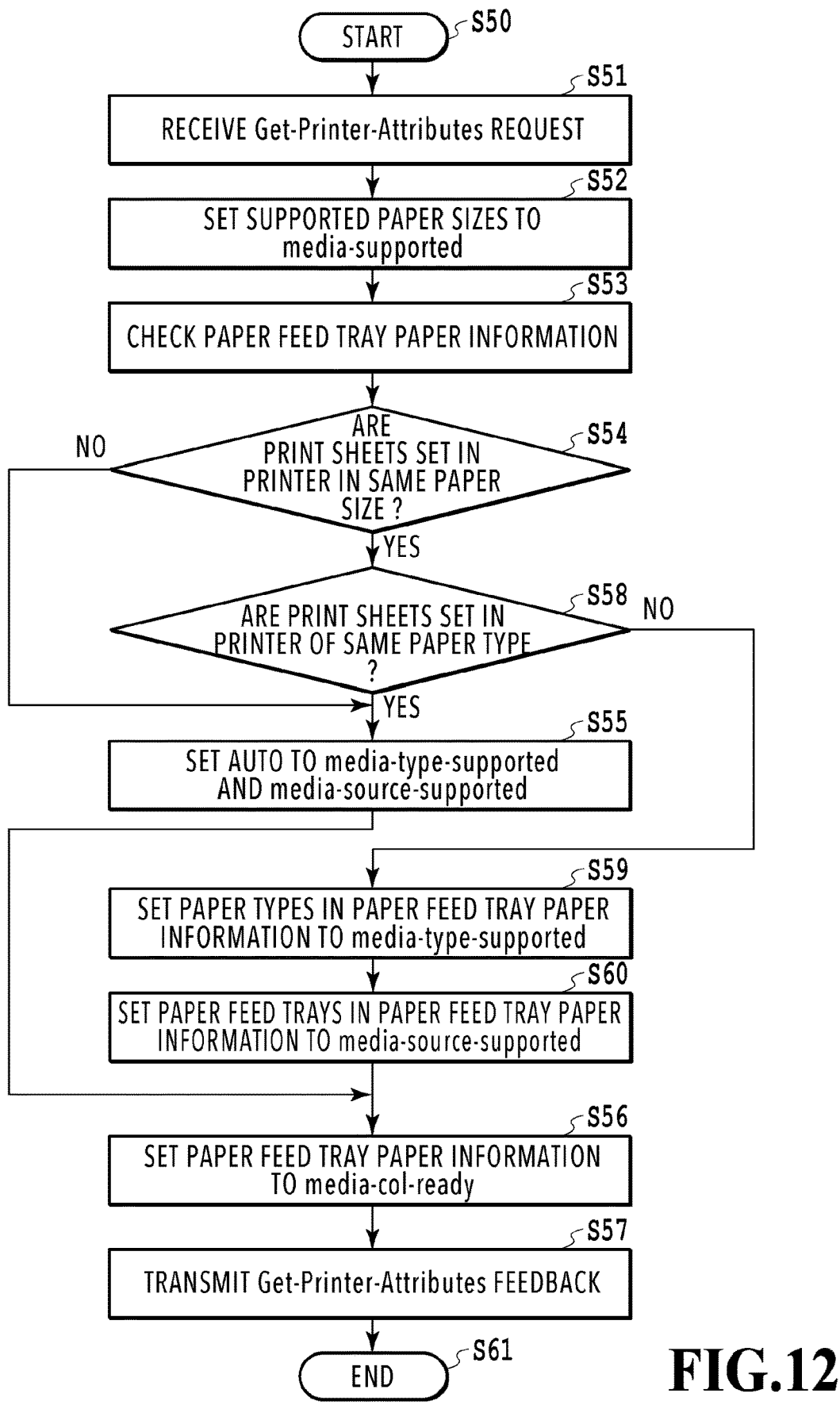
FIG. 12 is a flowchart showing feedback processing of the printer in a second embodiment.

Now, a description will be given of feedback processing to the PC 01 to be carried out in the case where the print control unit 22 of the printer 20 receives the printer information obtaining request from the print setting control unit 03 of the PC 01 with reference to the flowchart of FIG. 12. In S51, the print control unit 22 receives the printer information obtaining request (Get-Printer-Attributes). In S52, the print control unit 22 sets either supported paper sizes 70 shown in FIG. 13A or supported paper sizes 73 shown in FIG. 13B to the supported paper sizes (media-type-supported) to be fed back. In S53, the print control unit 22 checks the information (the paper feed tray paper information) on the paper sheets set in (registered with) the paper feed trays. In S54, the print control unit 22 determines whether or not the paper sheets set in the first cassette and the second cassette of the printer 20, respectively, are in the same paper size. Here, in the case of the determination that the paper sheets in different sizes are set in the first cassette and the second cassette of the printer 20, respectively, the print control unit 22 determines that it is possible to determine the paper feed tray to be used based on the paper sizes that are set corresponding to the respective cassettes, and proceeds to S55. In S55, the print control unit 22 sets "AUTO" to the supported paper type (media-type-supported) and as the supported paper feed tray (media-source-supported) to be fed back.

Meanwhile, in the case where the print control unit 22 determines in S54 that the paper sheets set in the first cassette and the second cassette are in the same size, the print control unit 22 proceeds to S58 and determines whether or not the paper sheets set in the first cassette and the second cassette of the printer 20, respectively, are of the same paper type. The print control unit 22 proceeds to S55 in the case where the paper sheets are determined to be of the same paper type. Here, in the case of the determination that the paper sheets set in the first cassette and the second cassette of the printer 20, respectively, are in the same size and of the same type, the result of output will be the same no matter which cassette the paper is fed out of. For this reason, the printer 20 can use any one of the paper feed trays. Accordingly, the print control unit 22 determines that it is possible to determine the paper feed tray to be used by the printer 20. Then, the print control unit 22 sets "AUTO" to the supported paper type (media-type-supported) and to the supported paper feed tray (media-source-supported) to be fed back. Note that the printer 20 is configured to use the first cassette preferentially in this embodiment as well in the case where any one of the paper feed trays can be used.

Figure 14:
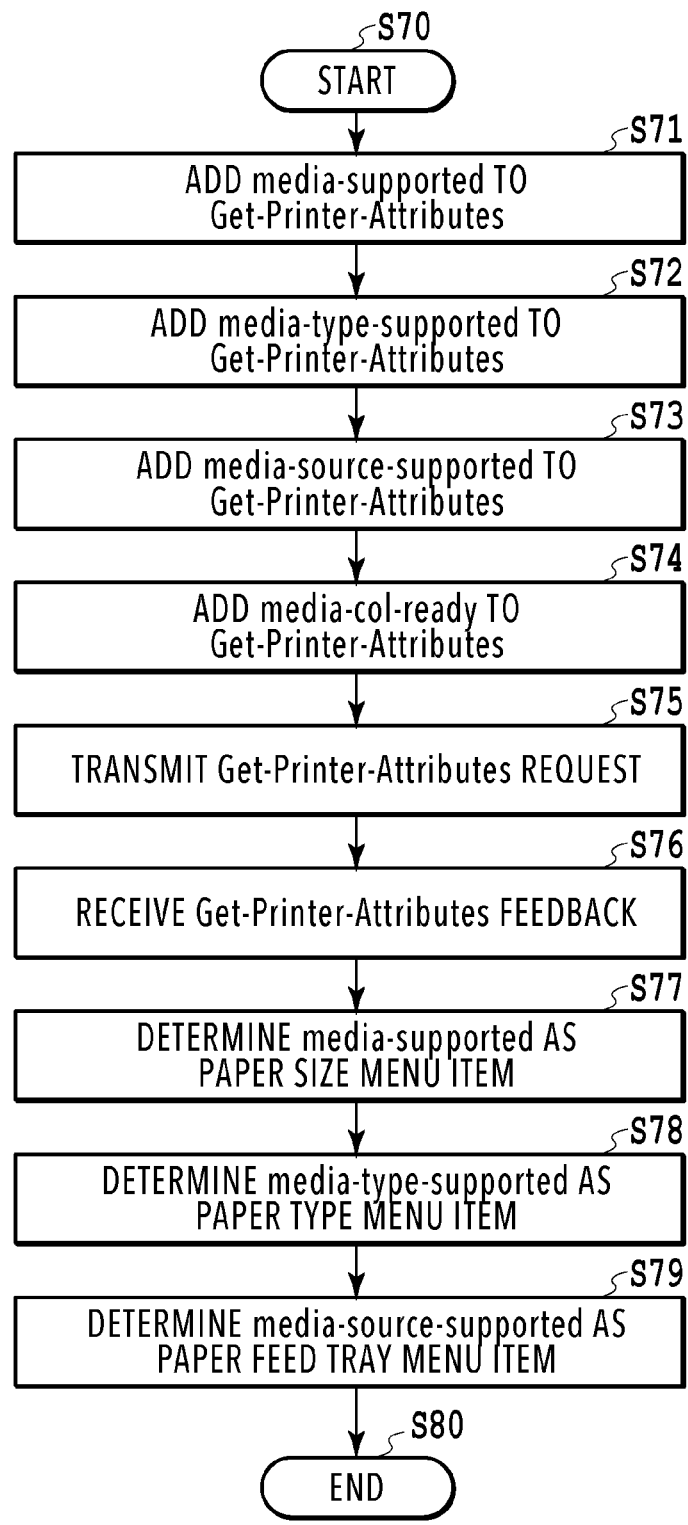
FIG. 14 is a flowchart showing the menu item determination processing of the print setting control unit.

On the other hand, in the case where the print control unit 22 determines in S58 that the types of the paper sheets set in the first cassette and the second cassette are different, the paper sheets in the same size but of the different types are set in the first cassette and the second cassette of the printer 20, respectively. In this case, the print control unit 22 determines that it is not possible to determine the paper feed tray to be used depending on the paper size, and proceeds to step S59. Then, in S59, the print control unit 22 sets the paper types (the paper types in the paper feed tray paper information), which are set in the first cassette and the second cassette, as the supported paper types (media-type-supported) to be fed back instead of "AUTO". Thereafter, in S60, the print control unit 22 sets the usable paper feed trays (the paper feed trays determined in the paper feed tray paper information) as the supported paper feed trays (media-source-supported) to be fed back instead of "AUTO". Subsequently, in S56, the print control unit 22 sets the information in any of FIGS. 9B, 9C, and 9D, for example, as the paper feed tray paper information (media-col-ready) to be fed back in response to the paper set in (registered with) the paper feed trays as with the first embodiment. Moreover, in S57, the print control unit 22 transmits the feedback to the printer information obtaining request to the print setting control unit 03 of the PC 01 through the NW communication control units 21 and 06. Then, the print control unit 22 proceeds to S61 and terminates the processing. FIG. 14 is a flowchart showing menu item determination processing to be executed by the print setting control unit 03 in S3 of FIG. 7. In FIG. 14, contents in S70 to S77 are the same as those in S10 to S17 described in FIG. 8 of the first embodiment, and explanation thereof will be omitted.

In the first embodiment, the print setting control unit 03 determines whether or not the printer 20 can determine the paper feed tray (the first cassette or the second cassette) to be used depending on the paper size in S19 and S21 even in the case where "AUTO" is included in the supported paper types (media-type-supported) and in the supported paper feed trays (media-source-supported). Then, in the case of the determination that the printer 20 cannot determine the paper feed tray to be used, the types of the paper sheets set in the paper feed trays of the printer 20 and the usable paper feed trays are set to the menu items on the paper type setting pop-up menu 46 and the paper feed tray setting pop-up menu 47 instead of "AUTO".

In contrast, in the second embodiment, the print control unit 22 of the printer 20 determines whether or not it is possible to determine the paper feed tray to be used based on the paper size instead of the print setting control unit 03 of the PC 01. This determination is carried out in a similar manner to S19 and S21 shown in FIG. 8. Then, the print control unit 22 of the printer 20 feeds back "AUTO" as the supported paper type and the supported paper feed tray or feeds back the types of the paper sheets set in the paper feed trays of the printer 20 as well as the usable paper feed trays in accordance with the result of determination of its own.

In S76, the print setting control unit 03 of the PC 01 receives the feedback from the printer 20. Accordingly, the print setting control unit 03 sets the supported paper types (media-type-supported) and the supported paper feed trays (media-source-supported) included in the printer information received from the printer 20 directly to the respective menu items on the paper type setting pop-up menu 46 and the paper feed tray setting pop-up menu 47. Specifically, in S78 of the flowchart in FIG. 14, the print setting control unit 03 sets the supported paper types (media-type-supported) included in the printer information received in S76 to the menu items on the paper type setting pop-up menu 46. Moreover, in S79, the print setting control unit 03 sets the supported paper feed trays (media-source-supported) included in the printer information received in S76 to the menu items on the paper feed tray setting pop-up menu 47. Thereafter, the print setting control unit 03 proceeds to S80 and terminates the processing.

This embodiment has described the example in which only "AUTO" is fed back as the supported paper type (media-type-supported) and as the supported paper feed tray (media-source-supported) in the case where the paper type and the paper feed tray can automatically be determined based on the paper size. However, "AUTO" may be fed back together with the paper types set in the paper feed trays of the printer 20 and the usable paper feed trays. In this case, the print control unit 22 sets "AUTO" as well as the paper types set in the paper feed trays of the printer 20 to the supported paper types (media-type-supported) to be fed back in S55 of FIG. 12. In addition, the print control unit 22 sets "AUTO" as well as the usable paper feed trays to the supported paper feed trays (media-source-supported). In this way, "AUTO" is displayed as the menu item in the initial state on the paper type setting pop-up menu 46 on the print setting screen 40 and the paper types set in the paper feed trays of the printer 20 are also displayed thereon.

In the meantime, "AUTO" is displayed as the menu item in the initial state on the paper feed tray setting pop-up menu 47 on the print setting screen 40 and the paper feed trays usable by the printer 20 are also displayed thereon. According to this configuration, the user can check the types of the paper sheets set in the respective paper feed trays and the usable paper feed trays on the print setting screen 40 even in the case of automatically selecting the paper type and the tray to be used. This makes it possible to further reduce the risk of printing on a paper sheet of an unintended type. As a consequence, it is possible to reduce the user's anxiety in the case of conducting remote printing by automatic paper feeding.

As described above, the same effects as the first embodiment can be expected from this embodiment which is configured to cause the printer to determine whether or not it is possible to selectively determine the cassette based on the paper information set to the printer. Specifically, in the case where the printer can determine the cassette based on the paper information, the appropriate paper is automatically supplied from the determined cassette. Meanwhile, the user is notified of the request for setting the paper type or the tray only in the case where the printer cannot determine the cassette. This makes it possible to select the tray appropriately by performing a minimum setting operation and thus to enhance efficiency in the setting operation.

Other Embodiments

The above-described embodiments have described an example in which the printing apparatus (the printer) includes two paper feed units (the first cassette and the second cassette). However, it is needless to say that the present invention is also applicable to a case where a printing apparatus includes three or more paper feed units. Moreover, although the cassettes have been described as examples of the paper feed units, the paper feed units may include not only the cassettes but also other modules such as a manual feed tray that allows manual setting of paper.

Meanwhile, the above-described embodiments have represented the example of determining whether or not the paper feed unit to be used for the printing can be selectively determined out of two or more paper feed units based on the piece of information indicating the size included in the paper information which is registered while being associated with the paper feed units (the cassettes). However, the present invention is not limited only to this configuration. The present invention can also be configured to determine whether or not it is possible to determine a used paper feed unit to be used for printing based on the information indicating the type out of the paper information. Specifically, it is determined that the used paper feed unit used for the printing can be determined in a case where there is only one paper feeding unit that contains the paper of the same type. Here, the relevant paper feed unit is determined as the paper feed unit to be used and the paper feeding is conducted accordingly. Meanwhile, in a case where there are two or more paper feed units that contain the paper of the same type, then the determination is made that it is not possible to determine the used paper feed unit and a user is requested to perform setting of designation information (information on the size of the paper) for determining the used paper feed unit. This makes it possible to perform paper feeding from a paper feed unit that contains the paper in the size and of the type intended by the user. As a consequence, it is also possible in this case to appropriately determine the used paper feed unit out of two or more paper feed units while involving a minimum setting operation, and thus to enhance efficiency of the setting operation.

In the meantime, the printing systems discussed in each of the first embodiment and the second embodiment is not formed from a single apparatus but is formed by connecting the PC 01 to the printer 20, which are installed at different locations, by using a specific bidirectional interface. However, the printing system according to the present invention is not limited only to this configuration. The printing system according to the present invention may be a printing system of an integrated type, which is embodied as an apparatus that incorporates the functions of the PC and the printer.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-033359 filed Feb. 28, 2020, which is hereby incorporated by reference herein in its entirety.

What is claimed is:

1. An information processing method performed by a processor of an information processing apparatus, comprising:
   an obtaining step of obtaining media information concerning paper sheets set in a plurality of media feed units provided in a printing apparatus, respectively; and
   a step of determining that designation information for designating a used media feed unit to be used for printing by the printing apparatus is not required in a case where the printing apparatus enables to selectively determine the used media feed unit from the plurality of the media feed units based on the media information, and indicating the designation information in a case where the printing apparatus does not enable to determine the used media feed unit based on the media information.

2. The information processing method according to claim 1, wherein the designation information is any one of type information designating a type of each paper sheet and size information designating a size of each paper sheet.

3. The information processing method according to claim 1, wherein the step of determining indicates that the printing apparatus enables to determine the used media feed unit based on the media information and that the designation information is not required in a case where there is only one media feed unit containing the paper sheets of the same type and the same size.

4. The information processing method according to claim 1, wherein the step of determining determines that the printing apparatus does not enable to determine the used media feed unit based on the media information and requests the designation information in a case where there are the plurality of media feed units containing the paper sheets of which either types or sizes are different.

5. The information processing method according to claim 1, wherein the step of determining determines that the printing apparatus enables to selectively determine the used media feed unit based on the media information in a case where there are the plurality of media feed units containing the paper sheets of the same type and the same size.

6. The information processing method according to claim 1, wherein the obtaining step obtains attribute information on the paper sheets set in the media feed units from the printing apparatus as the media information in accordance with Internet Printing Protocol.

7. An information processing method performed by a processor, comprising:
   a receiving step of receiving a request for obtaining printing apparatus information from an information processing apparatus;
   an obtaining step of obtaining media information concerning paper sheets set in a plurality of media feed units provided in a printing apparatus, respectively, in response to the request; and
   a step of determining that designation information for designating a used media feed unit to be used for printing by the printing apparatus is not required in a case where the printing apparatus enables to selectively determine the used media feed unit from the plurality of the media feed units based on the media information, and transmitting printing apparatus information including the designation information to the information processing apparatus in a case where the printing apparatus does not enable to determine the used media feed unit based on the media information.

8. An information processing apparatus comprising:
   at least one processor and at least one memory coupled to the at least one processor and having stored therein instructions executable by the at least one processor, the at least one processor and at least one memory cooperating to function as:
   an obtaining unit configured to obtain media information concerning paper sheets set in a plurality of media feed units provided in a printing apparatus, respectively; and
   a control unit configured to determine that designation information for designating a used media feed unit to be used for printing by the printing apparatus is not required in a case where the printing apparatus enables to selectively determine the used media feed unit from the plurality of the media feed units based on the media information, and to indicate the designation information in a case where the printing apparatus does not enable to determine the used media feed unit based on the media information.

9. The information processing apparatus according to claim 8, wherein the designation information is any one of type information designating a type of each paper sheet and size information designating a size of each paper sheet.

10. The information processing apparatus according to claim 8, wherein the control unit indicates that the printing apparatus enables to determine the used media feed unit based on the media information and that the designation information is not required in a case where there is only one media feed unit containing the paper sheets of the same type and the same size.

11. The information processing apparatus according to claim 8, wherein the control unit determines that the printing apparatus does not enable to determine the used media feed unit based on the media information and requests the designation information in a case where there are the plurality of media feed units containing the paper sheets of which either types or sizes are different.

12. The information processing apparatus according to claim 8, wherein the control unit determines that the printing apparatus enables to selectively determine the used media feed unit based on the media information in a case where there are the plurality of media feed units containing the paper sheets of the same type and the same size.

13. The information processing apparatus according to claim 8, wherein the obtaining unit obtains attribute information on the paper sheets set in the media feed units from the printing apparatus as the media information in accordance with Internet Printing Protocol.

14. An information processing apparatus comprising:
   at least one processor and at least one memory coupled to the at least one processor and having stored therein instructions executable by the at least one processor, the at least one processor and at least one memory cooperating to function as:
   a reception unit configured to receive a request for obtaining printing apparatus information from an information processing apparatus;
   an obtaining unit configured to obtain media information concerning paper sheets set in a plurality of media feed units provided in a printing apparatus, respectively, in response to the request; and
   a transmission unit configured to determine that designation information for designating a used media feed unit to be used for printing by the printing apparatus is not required in a case where the printing apparatus enables to selectively determine the used media feed unit from the plurality of the media feed units based on the media information, and to transmit printing apparatus information including the designation information to the information processing apparatus in a case where the printing apparatus does not enable to determine the used media feed unit based on the media information.

* * * * *